Nov. 2, 1948.  B. A. SOMERS ET AL  2,452,609
ANTIHUNT FOLLOW-UP SYSTEM
Filed Oct. 2, 1942  2 Sheets-Sheet 2
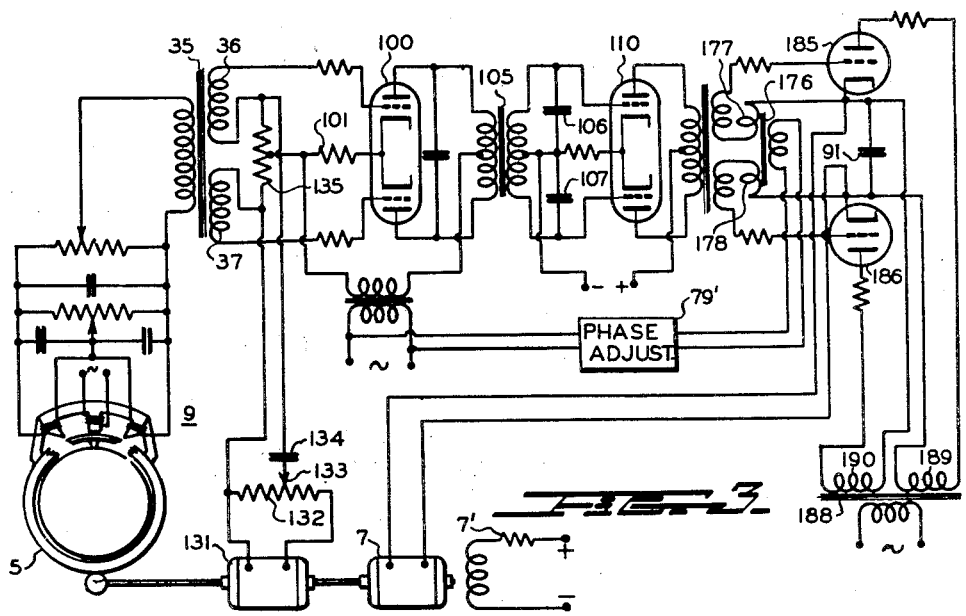
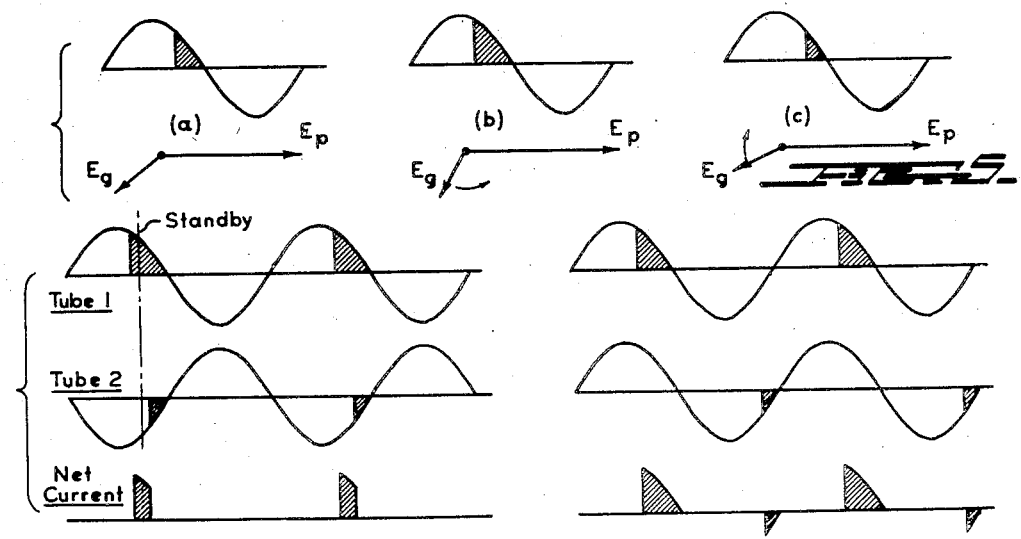
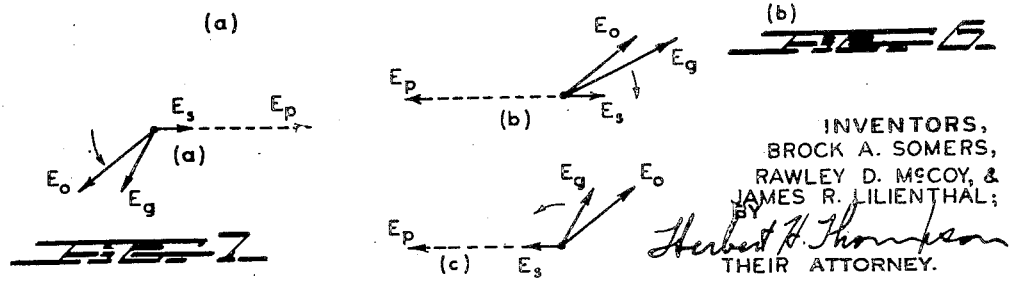
INVENTORS,
BROCK A. SOMERS,
RAWLEY D. McCOY, &
JAMES R. LILIENTHAL;
BY Herbert H. Thompson
THEIR ATTORNEY.

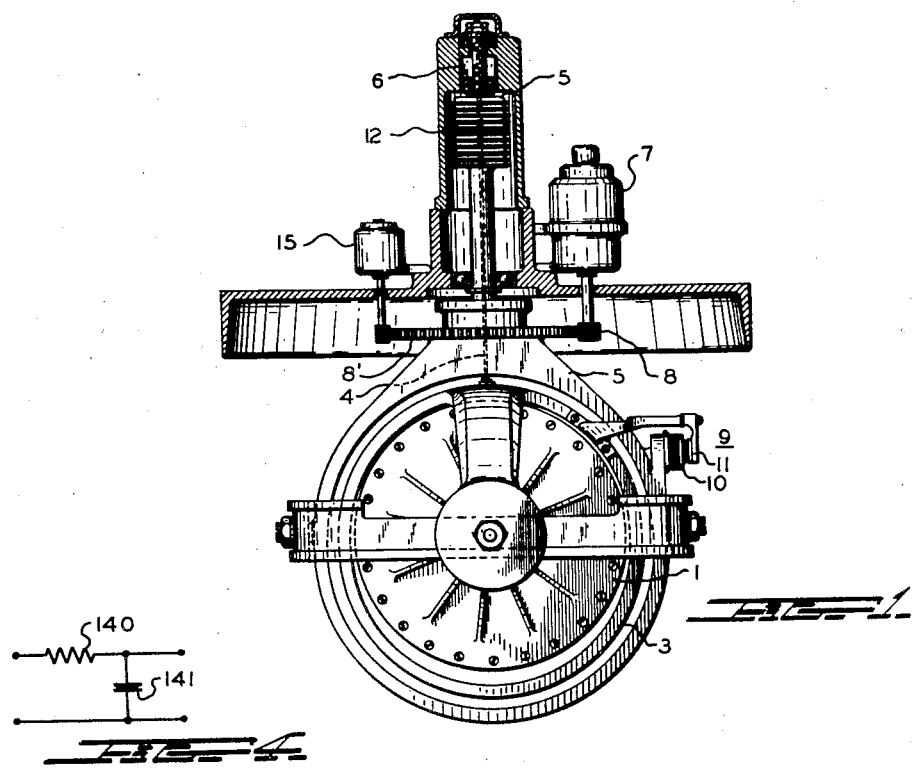
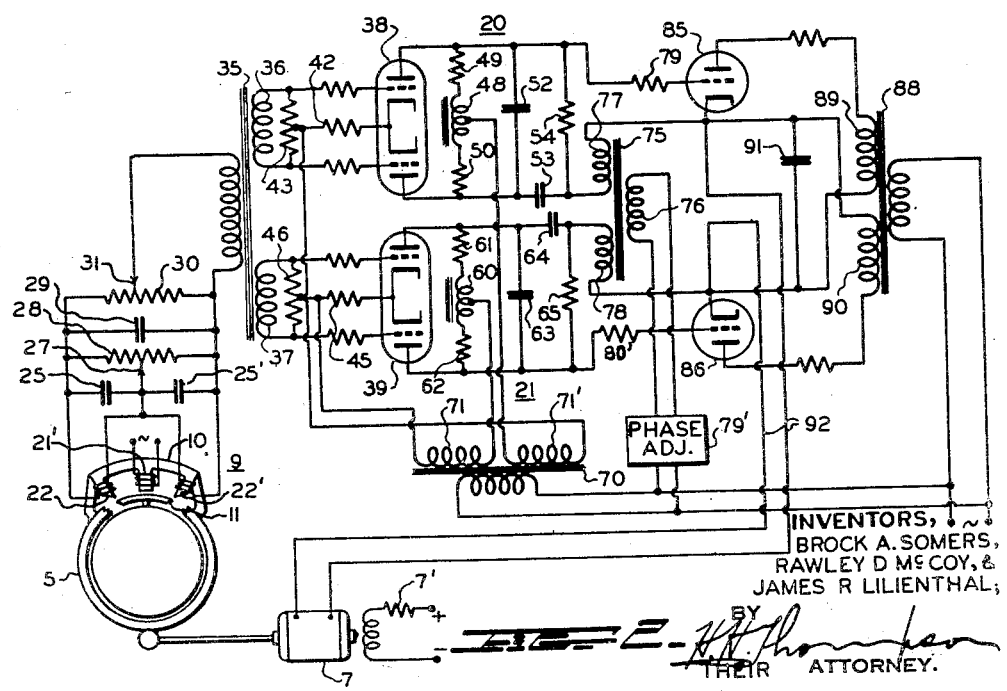

Patented Nov. 2, 1948

2,452,609

UNITED STATES PATENT OFFICE 2,452,609

ANTIHUNT FOLLOW-UP SYSTEM

Brock A. Somers, Garden City, Rawley D. McCoy, Bronxville, and James R. Lilienthal, Brooklyn, N. Y., assignors to The Sperry Corporation, a corporation of Delaware Application October 2, 1942, Serial No. 460,726

9 Claims. (Cl. 318—31)

This invention relates to amplifiers suitable for use in electrical servo or follow-up systems, particularly systems designed to cause a power-driven object to follow changes of position of a sensitive controlling object, such as a magnetic or gyroscopic compass, without exerting a harmful reaction upon the controlling object.

For example, in a gyroscopic compass the sensitive north-seeking gyro element is acted upon by a very weak directive force so that the element cannot directly operate power consuming devices such as the transmitters of remote indicating systems for repeating the compass indication. Instead, a so-called "phantom" element driven by independent power means is continuously positioned in correspondence with the position of the sensitive element by a follow-up system which includes means for generating an electrical impulse responsive to disagreement between the positions of the sensitive and "phantom" elements and means for amplifying this disagreement signal to a power level high enough to operate a motor driving the "phantom" element in azimuth. One type of compass follow-up, employing an A. C. operated motor, is disclosed in U. S. Patent No. 2,139,558, to F. L. Moseley et al., dated December 6, 1938, and assigned to the assignee of the present invention.

If the power necessary to control the motor in such a follow-up system is not too great, the amplifier may employ high vacuum electron tubes in all stages of amplification. When greater power is required, however, the output stage of the amplifier commonly comprises tubes of the grid-controlled, gaseous conduction or "thyratron" type.

To obtain reversible operation of the driving means when the latter type of tube is employed, the amplifier output stage includes two tubes or groups of tubes in a balanced circuit and, due to the inherent intermittent conduction characteristics of the tubes when operated on alternating current, as is customary, and to the phase relationships involved, considerable difficulty has been experienced with prior arrangements because of interaction between the two halves of the output circuit respectively associated with the oppositely controlling tubes.

The present invention overcomes these difficulties by circuit arrangements causing oppositely controlling tubes to fire during alternate halves of the plate voltage cycle. Transient disturbances due to the firing of one tube (or set of tubes) are thus prevented from affecting the oppositely acting tube since both tubes are not simultaneously in a conducting state. In addition, no harmful coupling between the circuit halves results from a common impedance such as that of the driving means since a voltage drop produced by current in the operating half of the circuit is incapable of affecting the quiescent half of the circuit.

In addition to preventing interaction between the two oppositely acting portions of the amplifier circuit, it is highly desirable to cause the controlled object to follow the position of the controlling object smoothly without hunting or other motional disturbance. To accomplish this, it is known that it is necessary to apply to the motive means driving the controlled object a controlling impulse proportional not only to the momentary positional disagreement of the two objects but one which also has components proportional to time derivatives (or integrals) of the displacement of the objects. Such secondary terms are often referred to as "rate" signals. In "thyratron" amplifiers of the aforementioned type, and particularly those in which control is exercised by a phase shift of the grid potentials, we have found that special circuit arrangements are necessary to introduce rate signals simultaneously with the basic disagreement or lag signal.

While, by way of illustration, reference is made to the use of the invention in connection with gyroscopic compasses, it will be apparent that amplifiers of the disclosed type find application to follow-up or servo systems of many other types and for many other uses. It is, therefore, one object of the invention to provide improved means for positioning a controlled object in correspondence with the position of a sensitive controlling object without exerting a harmful reaction upon said controlling object.

Another object of the invention is to provide improved follow-up means for a gyroscopic or magnetic compass, whereby a power-driven member is positioned in accordance with the position of the sensitive north-seeking element.

Another object is to provide, in a positional control or follow-up system, a balanced reversible-control amplifier of the "thyratron" type in which the effects of oppositely acting output impulses are independent of one another.

Another object is to provide "rate" signal circuits in a balanced amplifier having oppositely acting tubes supplied with alternating plate potentials of opposite phase.

Another object is to provide in a follow-up amplifier a pair of similar rate taking circuits, operable in parallel, each passing the displacement signal.

Another object is to provide, in an amplifier, a feedback circuit having derivative taking or integrating means.

A further object is to provide, in a follow-up system, an amplifier having means for producing a feed-back voltage in accordance with motion of the controlled object including means for taking time derivatives or time integrals of a primary feed-back voltage.

Other objects and advantages will become apparent as the description proceeds.

Referring to the figures,

Fig. 1 is an elevation, partly in section, of a gyroscopic compass showing pick-up means suitable for supplying an input to the amplifier of the present invention and driving means for the "phantom" element.

Fig. 2 is a wiring diagram of a follow-up amplifier and associated apparatus, according to the invention.

Fig. 3 is a wiring diagram of a modified form of a follow-up amplifier.

Fig. 4 is a modification of a detail of the circuit of Fig. 3.

Figs. 5, 6 and 7 are diagrams for purposes of explanation.

Referring first to Fig. 1, there is shown a simplified view of a gyroscopic compass, as seen in north or south elevation, with a follow-up transformer mounted thereon. Reference numeral 1 is applied to the gyro rotor case which houses a rotor (not seen) spinning about a horizontal axis. Case 1 is supported in horizontal bearings on a vertical ring 3 which in turn is suspended by a wire suspension 4 from "phantom" element 5 supported in anti-friction bearings 6 for free rotation in azimuth. An azimuth motor 7 having a field 7' permanently excited from a D. C. source (Fig. 2) is shown connected to drive "phantom" element 5 by means of pinion 8 and gear 8'. Core 10 of follow-up transformer 9 is mounted on the "phantom" element and cooperating armature 11 (Figs. 2 and 3) is mounted on a bracket extending from vertical ring 3. Slip rings and brushes 12 are provided for making connection to the follow-up transformer and other rotatable members. One or more transmitters, as 15, for synchronous repeating systems may be driven from gear 8' or other part of the "phantom" structure.

Core 10 of transformer 9 is a three-legged structure (Fig. 2), the center leg of which mounts an exciting winding 21' connected to an alternating current supply common to the amplifier which may, in some applications, have a frequency of several hundred cycles per second. The two outer legs mount a pair of output windings 22, 22' connected in opposition. Cooperating armature 11 is normally centrally positioned with respect to the three legs of core 10 so that a magnetic circuit is provided causing equal and opposite voltages to be induced in the two outer windings 22, 22'. Departure of armature 11 from its normally central position differentially changes the mutual inductance between winding 21' and windings 22, 22' to supply a net output signal voltage from the transformer proportional to the relative displacement of core 10 and armature 11.

As seen in the wiring diagram of Fig. 2, windings 22, 22' are bridged by condensers 25 and 25', respectively, to tune the windings to the frequency of the supply voltage. The junction of the two condensers is connected to adjustable contact 27 on resistance 28 bridging the pick-up coils. Contact 27 provides a balancing adjustment to secure zero or a minimum output from coils 22, 22' when armature 11 is in a nominally central position and the use of tapped resistance 28 aids in securing a sudden reversal of phase of the net output from coils 22, 22' when armature 11 passes through its balanced position. Resistance 28 is paralleled by condenser 29 to reduce harmonics of the fundamental signal voltage.

An adjustment of the utilized displacement or positional disagreement signal voltage is provided by potential divider 30 having an adjustable contact 31 whose position determines the voltage applied to amplifier input transformer 35. Transformer 35 has a pair of secondary windings 36, 37 which apply the displacement signal in like phase relationship to similar rate amplifier circuits 20 and 21, each including a double rectifier tube 38, 39 having the two elements thereof connected in push-pull relationship. The input circuit of tube 38 includes a conventional biasing resistance 42 and a tapped shunt resistance 43 for deriving the mid point of the circuit. Corresponding elements in the input circuit of tube 39 are biasing resistance 45 and tapped resistance 46. The normal potential drops across resistances 42 and 45 are such that tubes 38 and 39 are biased to rectify (at least partially) the alternating input disagreement signal.

Shunted across the two plates of tube 38 is a circuit comprising inductance or choke coil 48 and symmetrically connected resistances 49 and 50.

In practice, resistances 49 and 50 may be dispensed with if the resistance of coil 48 is suitable to provide the desired circuit characteristics without external resistance. A shunt condenser 52, a series condenser 53 and a shunt resistance 54 provide filtering and rate-taking elements whose functions will be described hereinafter. The output circuit of tube 39 is similar in all respects to that of tube 38 and comprises corresponding elements including rate-taking choke 60 and associated resistances 61, 62, together with shunt condenser 63, series condenser 64 and shunt resistance 65.

The plate circuits of tubes 38 and 39 are supplied by way of centrally located taps on coils 48 and 60, with alternating potentials from secondary windings 71 and 71', respectively, of transformer 70, connected to the common A. C. supply.

The outputs of the individual rate amplifiers 20 and 21 appear as potentials across resistances 54 and 65, respectively, in the grid circuits of "thyratron" tubes 85 and 86, which include series resistances 79 and 80 respectively. The circuit connections are such that the similar A. C. disagreement signals applied to tubes 85 and 86 are in phase. Tubes 85 and 86 are also supplied with an A. C. grid bias from secondary windings 77 and 78, respectively, of transformer 75 having a primary winding 76 connected to the common A. C. source. Windings 77 and 78 are connected to supply biases of opposite phase to the two tubes.

Alternating plate potentials for tubes 85 and 86 are derived from the same source by way of transformer 88 having a pair of secondary windings 89 and 90 and the rectified plate currents of these tubes are supplied to motor 7 by way of leads 92 which connect the motor between the two cathodes. According to the invention these plate potentials are also 180° out of phase and there is a phase difference between the biasing and plate potentials secured by suitable known phase adjusting means 79'.

In operation, relative displacement of vertical ring 3 of the sensitive gyro element and "phantom" element 5 by relatively displacing armature 11 and core 10 gives rise to an unbalanced voltage in transformer windings 22, 22', a portion of which, adjustable by means of contact 31, is applied simultaneously to the inputs of the two similar rate-taking amplifiers 20 and 21. Considering amplifier 20, dual or balanced rectifier tube 38 is biased to a non-linear portion of its operating characteristic and is phase sensitive so that upon application of a disagreement signal a differential output is obtained from its two plate circuits comprising an A. C. and a D. C. component, each proportional to the applied disagreement voltage. The A. C. component is of reversible phase in correspondence with the output of transformer 9 which reverses in phase with departures of armature 11 from its normally central position in opposite directions.

This A. C. component appears as an alternating potential across resistance 54, modified to some extent by the shunting effect of condenser 52. As long as the output of tube 38 is constant the D. C. component is prevented from causing a current flow in resistance 54 by the blocking action of condenser 53. When this output varies, due to a changing relative displacement of transformer core 10 and armature 11, a reactive voltage drop is produced across choke 48 proportional to the rate at which such change occurs. The non-alternating voltage across the outer terminals of resistances 49, 50 then has two components, the net drop across the resistances themselves, which is proportional to the disagreement signal, and the drop across choke 48 proportional to the rate of change of said signal. The net drop across resistances 49 and 50 reverses in polarity with change of input phase, since rectifier 38 is rendered phase sensitive by its A. C. plate supply, while the polarity of the voltage across choke 48 depends on whether the rate of displacement of armature 11 with respect to core 10 is increasing or decreasing. Both components are modified by the combination of condenser 53 and resistance 54 which constitute a differentiating circuit, as is known in the art, so that the final component rate voltages across resistance 54 are proportional to the first and second time derivatives of the relative displacement or positional disagreement of transformer core 10 and armature 11, that is of the "phantom" element and sensitive gyro element. These rate potentials across resistance 54 are in addition to the A. C. disagreement signal already described. Condenser 52 because of its greater admittance to the relatively higher frequency disagreement signal serves as an adjustment of the ratio of the utilized disagreement voltage to the rate voltage.

There are therefore applied to the grid of tube 85 an A. C. bias, an A. C. disagreement signal and, under described conditions, a D. C. rate signal or signals.

The construction of rate amplifiers 20 and 21 being identical, it will be apparent that there is applied to the grid of tube 86 a combination of signal and bias voltages similar to that described in connection with tube 85. The significance of phase relationships in their effect on the current supplied to motor 7 will now be considered.

The operation of tubes 85 and 86 under various phasings of the applied voltages will be better understood by reference to the explanatory diagrams of Figs. 5 to 7. Fig. 5 illustrates the well-known principle of phase-shift control, which is utilized to cause the disagreement signal to produce a differential change of the outputs of the two tubes. Thus, in diagram (a) the shaded area under the curve represents the flow of rectified current in the plate circuit of a "thyratron" tube during the conducting half cycle, when the phase of the A. C. grid potential $E_g$ is in some assumed relationship (e. g. 140°) to that of the plate potential $E_p$, while the oppositely directed changes which occur when the phase of the grid potential is rotated toward and away from that of the plate potential are shown by diagrams (b) and (c), respectively.

In applying this principle to the firing of tubes 85 and 86, it will be apparent that if the potentials applied by plate supply transformer windings 89 and 90 (Fig. 2) were of the same phase, causing the conducting half cycles of the two tubes to coincide, as has heretofore been customary, an A. C. disagreement signal applied in the same phase relationship to the two grids would produce no net output from the tubes but if applied oppositely, thereby oppositely rotating the phases of the grid potentials, the differential change of plate current illustrated in the two upper curves of diagram (a) of Fig. 6 is produced. The shaded portions of these two curves may be considered to represent rectified currents which would be supplied by the tubes to motor 7 in opposite directions under the assumed conditions. The resultant motor current then, as shown by the bottom curve, would be in the form of steep sided impulses spaced a cycle apart. The just described in-phase relationship of the plate potentials and the out of phase relationship of the signal voltage in a balanced "thyratron" amplifier are characteristic of the prior art.

This earlier method of operation has several major disadvantages including:

(1) The reaction, on the first tube, of the second tube to fire, due to the coupling of the two tube circuits, principally through the motor armature impedance.

(2) The necessity for using large capacities to integrate the short, steep, spaced impulses to obtain a substantially steady input to motor 7. This integration is accomplished by a condenser, such as condenser 91, across the motor armature and the large capacity required under the above described conditions of operation, according to prior art, results in a sluggish response of the motor to weak signals.

By supplying plate potentials to tubes 85 and 86 in 180° out of phase relation, in accordance with the present invention as described hereinbefore, the conducting half cycles of the tubes alternate and only one tube is in a condition to fire at any instant, thus preventing mutual reaction. This condition is illustrated in diagram (b) of Fig. 6 where the shaded areas representing motor current components are again drawn respectively above and below the base line, as in Fig. 6(a). The resultant current impulses as seen in the lowest curve of Fig. 6(b) are spaced only a half cycle apart and are of a nature requiring relatively small capacity in condenser 91 to obtain a satisfactory filtering action, in comparison with the conditions of Fig. 6(a).

The vector diagrams of Fig. 7 show that when opposite phasing of the plate potentials of tubes 85 and 86 is adopted the disagreement signals must be applied in phase to the grids. They also illustrate the vector relation of the A. C.

grid bias to the other tube voltages and its effect in causing grid phase shift. Assume that diagram (a) of this figure represents the alternating potentials applied to tube 85. There is exhibited the rotation of the grid phase toward the plate potential $E_p$ by the addition to the A. C. grid bias $E_0$ of an A. C. signal $E_s$ in phase with the plate potential, resulting in a net grid potential $E_g$. Diagram (b) may be assumed to represent voltages simultaneously applied to tube 86. The plate and grid bias potentials are in opposite directions or phase to those of Fig. 7(a), in accordance with the described arrangements, and by the application of a signal voltage $E_s$ in the same direction as that in Fig. 7(a) the grid phase is rotated oppositely to that of tube 85, i. e. away from the plate potential, resulting in a differential output from the two tubes.

If, on the other hand, the A. C. signal applied to tube 86 were of the same phase as that applied to tube 85 (the condition illustrated in Fig. 7(c)) the phase of the grid potential would be rotated toward that of the plate and no differential output from the two tubes would result. The opposite phasing of the plate potentials of the two tubes then requires like phase of the A. C. signal potentials.

The phase relationships discussed above relate to the applied alternating voltages and apply to single amplifier circuits as well as the arrangement of dual rate amplifiers 20 and 21 disclosed in Fig. 1. The dual arrangement is necessary when rates of the disagreement signal in the form of D. C. impulses are generated in the same circuit or circuits which apply the disagreement signal to the output stage. Since A. C. signals applied to the grids of tubes 85 and 86 must be in phase to obtain the advantages of out of phase plate potentials, it will be evident that if only a single rate amplifier circuit, such as 20, were employed simultaneously to pass the A. C. disagreement signal and generate D. C. rate potentials, these latter potentials would raise or lower the net grid potentials of both tubes together, with no differential change of output. By connecting dual rate circuits as in Fig. 2, the rate voltages across resistances 54 and 65 may be applied to the grids of tubes 85 and 86 respectively, in opposite directions while the A. C. disagreement signals may be applied in the same direction or phase, as controlled by the phasing of windings 36 and 37 of input transformer 35.

The input to motor 7 is a reversible direct current resulting from a differential change of the rectified outputs of tubes 85 and 86. Since motor field 7' is constantly excited from a D. C. source, reversible operation of the motor is thus obtained in correspondence with reversals of phase of the output of transformer 9, and is caused to be in a direction to wipe out the disagreement signal. Very close following may be obtained by the described circuit since the rate terms prevent the overshooting and hunting usually associated with close following and transient disturbances in the output "thyratron" stage of the amplifier are greatly reduced.

In the diagrams of Fig. 6 the standby current has been exaggerated to bring out the differential changes produced by the signals more clearly. Actually only very small currents flow in the plate circuits of the output tubes under standby conditions. This, however, does not alter the described operation or the advantages thereof when close following is to be obtained since the differential changes in current are then also normally small.

Instead of employing a circuit which produces rates of the disagreement signal in the same circuit or circuits which pass the disagreement signal, the damping of a follow-up or positional control system may be effected by the modification of the invention shown in Fig. 3. The follow-up transformer 9 and the associated circuits up to and including input transformer 35 are similar to those described in connection with Fig. 2. In this case, however, secondary windings 36 and 37 apply the disagreement signal in opposite phase relationship, to the grids of a single dual rectifier or modulator tube 100 biased to a non-linear portion of its operating characteristics by the potential drop across resistance 101 in the grid circuit.

Tube 100 is coupled to a succeeding amplifier stage including balanced amplifier tube 110 by a coupling transformer 105 and suitable balancing arrangements including condensers 106 and 107. The output of tube 110 is preferably applied in phase to the grids of thyratron tubes 185, 186 corresponding respectively to tubes 85 and 86 of Fig. 1 to obtain the described advantages of out of phase plate potentials although the form of the invention disclosed in Fig. 3 is not limited to such operation. These tubes are oppositely biased by potentials supplied from the secondary windings 177, 178 of transformer 176.

The plate potentials of tubes 185, 186, as noted, are preferably of opposite phase and are derived from secondary windings 189, 190 of supply transformer 188. The resultant rectified output current of tubes 185 and 186 supply opposite operating impulses to azimuth motor 7 as in the case of Fig. 2. Mounted on the shaft of motor 7 is a generator 131 suitably excited (by means not shown, such as a permanent magnet field) whose output is applied across potential dividing resistance 132 having a contact 133 positionable along the resistance. The utilized portion of the potential drop across resistance 132 is applied to center-tapped input resistance 135 by way of a condenser 134.

The operation of that part of the amplifier circuit including tubes 100 and 110 will be clear from the explanation of the operation of the circuit of Fig. 2. No rates are taken in the direct amplifying circuit. Generator 131 being driven in correspondence with motor 7 and "phantom" element 5 and being constantly excited supplies a voltage across resistance 132 which is proportional to the rate of change of position of element 5. The utilized portion of this voltage is modified by the combination of condenser 134 and resistance 135, which constitute a differentiating circuit, so that the voltage appearing across the terminals of resistance 135 is proportional to the rate of change of the generator voltage and therefore proportional to the second time derivative of the displacement of "phantom" element 5, that is, proportional to the acceleration of said element.

The operation of a differentiating circuit in supplying a rate term to prevent hunting, when sinusoidal oscillations are considered, is to shift the phase of an applied signal through an angle approaching 90°. It is known that a combination of series resistance and shunt inductance may replace that of a series capacitance, as 134, and a shunt resistance, as 135, in producing such shift. It is known also that the time constant of the circuit may be adjusted to adjust the phase shift produced and thus relatively alter the in-phase and 90° out of phase components of the output. These components may also be relatively altered by shunting the reactive element, as 134, by a resistance as disclosed in U. S. Patent 2,233,415 to H. L. Hull, dated March 4, 1941 and assigned to the assignees of the present invention. However, in the present instance, the latter arrangement has the disadvantage of introducing an undesirable lag in following when the controlled object is moving at a constant speed. It will be evident that the circuit comprising generator 131, resistance 132, condenser 133 and resistance 135 constitute a feedback for supplying a portion of the output energy of the amplifier to the input of tube 100 and for causing a predetermined phase shift in the process.

The potential drop across resistance 135 constitutes a variable D. C. bias applied to the grids of tube 100 and therefore a variation of this potential results in a change of the A. C. output of this tube, supplemental to or superimposed upon the change in output produced by a disagreement signal introduced by way of transformer 35. Tube 100 is both sensitive to the phase of the A. C. disagreement signal, because of its A. C. plate supply, and sensitive to the polarity of the voltage across resistance 135, since the direction of the differential change of potential of the two grids of the tube depends on such polarity. The signal applied to the grids of tubes 185, 186, in the circuit of Fig. 3, is entirely alternating in character without D. C. rate components as with the arrangement of Fig. 2, and produces a differential change of output of these tubes in accordance with the phase shift principle of control described hereinbefore.

Instead of the differentiating circuit including condenser 134 and resistance 135, the integrating circuit of Fig. 4 may be substituted as a hunt preventing means. In this case, resistance 140 will replace condenser 134 and condenser 141 will replace resistance 135 in the circuit of Fig. 3. Since integration of a sinusoidal voltage results in a phase shift in the opposite direction from differentiation, either the input connections to or the output connections from the circuit of Fig. 4 are to be reversed with respect to the corresponding connections of the circuit formed by condenser 134 and resistance 135, to maintain the proper direction of phase shift to inhibit hunting.

By the described follow-up system "phantom" 5 may be caused to follow change of position of the vertical ring 3 of the sensitive element with only extremely small disagreement existing therebetween at any time and without jerky operation or hunting. Also, by supplying an input signal proportional to the positional disagreement of the two objects to any of the amplifying circuits disclosed herein, any inertial object may be controlled by a controlling object whether said objects are in adjacent or remote relationship.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. In a follow-up system for gyro compasses and the like embodying means furnishing a reversible electrical signal responsive to the magnitude and sense of the positional disagreement of the sensitive and "phantom" elements, a two-branch circuit fed thereby, each branch comprising means for obtaining a composite potential having a reversible phase alternating component corresponding to said signal and a reversible polarity non-alternating component derived from said signal and proportional to a time derivative of change of said disagreement, grid controlled rectifier tubes receiving said composite potentials respectively in like phase relationship and differentially controlled thereby, circuit means for supplying grid bias potentials and plate potentials to said tubes each in opposite phase relationship to tubes respectively associated with different ones of said branches and a direct current, constantly excited motor reversibly actuated by the outputs of said tubes for positioning said "phantom" element.

2. In a follow-up system embodying an alternating potential source and means excited from said source for producing an alternating potential disagreement signal, a pair of signal channels, each receiving said disagreement signal and each comprising rate taking elements together with at least one grid controlled rectifier output tube and a constantly excited direct current motor reversibly controlled by the rectified outputs of said tubes, output tubes in different channels of said pair of channels receiving oppositely phased alternating bias potentials and oppositely phased alternating plate potentials from said source, each tube receiving a composite input comprising an alternating potential proportional to said signal and a uni-directional potential proportional to a time derivative thereof, said alternating potential inputs being applied in the same phase relationship to all tubes.

3. In a positional control system embodying means for supplying a signal proportional to the positional disagreement of a controlling and a controlled object, a pair of parallel circuits each receiving a potential proportional to said disagreement signal and each comprising rate-taking elements for supplying a composite potential having components respectively proportional to said signal and a time derivative thereof, grid controlled rectifier tubes respectively receiving the outputs of said circuits and supplying rectified currents proportional thereto in opposite directions to a load and an alternating potential source, rectifier tubes connected to different circuits of said pair being oppositely biased from said source and receiving oppositely phased plate potentials therefrom.

4. In a pick-off for a follow-up system, a core having a pair of parallel magnetic circuits, alternating potential means for exciting said circuits, an armature normally positioned to equalize the flux in said two circuits, an output winding having serially connected portions thereof receiving normally equal and opposite induced voltages resulting from the excitation of said core, means for independently tuning said winding portions to the frequency of said supply and potentiometer means connected across said two tuned circuits for equalizing potentials derived therefrom and controlling the relative phase thereof.

5. In a positional control system embodying means for supplying an alternating signal voltage having its amplitude dependent upon the magnitude of relative displacement of a controlling and a controlled object, a pair of parallel circuits each adapted to receive a potential proportional to said signal voltage and each comprising rate-taking means for providing a potential having components thereof proportional to said displacement signal and a time derivative thereof, grid controlled rectifier tubes connected respectively to receive the outputs of said pair of parallel circuits, means for supplying plate potentials in opposite phase relationship to the respective plates of said tubes, and means for supplying a biasing potential in opposite phase relationship to said tubes, the displacement component of the control signal being supplied in like phase relationship to said tubes.

6. In a positional control system embodying means for supplying a signal voltage proportional to the positional disagreement of a controlling and a controlled object, means for supplying a signal proportional to a time derivative of said first mentioned signal, an amplifier connected to receive said signals and comprising a pair of rectifier tubes including cathode, plate and control electrodes, a source of alternating plate potential connected to the plates of said tubes in out of phase relationship, a source of alternating bias potential connected to the control electrodes of said tubes in out of phase relationship but in such relation to the plate potentials as to cause said tubes to conduct on positive half cycles of plate potential supplied thereto.

7. In a positional control system embodying means for supplying a signal voltage proportional to the positional disagreement of a controlling and a controlled object, means for supplying signals proportional to first and second time derivatives of said first mentioned signal, an amplifier connected to receive said signals and comprising a pair of rectifier tubes including cathode, plate and control electrodes, a source of alternating plate potential connected to the plates of said tubes in out of phase relationship, a source of alternating bias potential connected to the control electrodes of said tubes in out of phase relationship but in such relation to the plate potentials as to cause said tubes to conduct on positive half cycles of plate potential supplied thereto.

8. The combination recited in claim 6 in which the means for supplying a time derivative signal comprises a network having impedance and reactance.

9. The combination recited in claim 7 in which the means for supplying the time derivative signals comprises a first impedance-reactance network connected to receive said disagreement signal and a second impedance-reactance network connected to the output of said first network.

BROCK A. SOMERS.
RAWLEY D. McCOY.
JAMES R. LILIENTHAL.

REFERENCES CITED

The following references are of record in the file of this patent:

UNITED STATES PATENTS

| Number | Name | Date |
|---|---|---|
| 1,483,172 | Garnett | Feb. 12, 1924 |
| 1,576,195 | Junken | Mar. 9, 1926 |
| 1,694,237 | Simonds | Dec. 4, 1928 |
| 1,909,153 | Smiley | May 16, 1933 |
| 1,921,983 | Wittkuhns | Aug. 8, 1933 |
| 1,977,624 | Davis | Oct. 23, 1944 |
| 2,085,595 | Livingston | June 29, 1937 |
| 2,088,659 | Moseley | Aug. 3, 1937 |
| 2,275,317 | Ryder | Mar. 3, 1942 |